United States Patent
Lee et al.

(10) Patent No.: US 12,308,419 B2
(45) Date of Patent: May 20, 2025

(54) NEGATIVE ELECTRODE AND SECONDARY BATTERY INCLUDING THE SAME

(71) Applicant: LG ENERGY SOLUTION, LTD., Seoul (KR)

(72) Inventors: Su Min Lee, Daejeon (KR); Yong Ju Lee, Daejeon (KR); Dong Hyuk Kim, Daejeon (KR); Se Mi Park, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 466 days.

(21) Appl. No.: 17/769,808

(22) PCT Filed: Nov. 16, 2020

(86) PCT No.: PCT/KR2020/016074
§ 371 (c)(1),
(2) Date: Apr. 18, 2022

(87) PCT Pub. No.: WO2021/101188
PCT Pub. Date: May 27, 2021

(65) Prior Publication Data
US 2022/0384781 A1 Dec. 1, 2022

(30) Foreign Application Priority Data
Nov. 18, 2019 (KR) .................. 10-2019-0147927

(51) Int. Cl.
| | | |
|---|---|---|
| *H01M 4/36* | (2006.01) | |
| *H01M 4/48* | (2010.01) | |
| *H01M 4/587* | (2010.01) | |
| *H01M 4/62* | (2006.01) | |
| *H01M 10/052* | (2010.01) | |
| *H01M 4/02* | (2006.01) | |

(52) U.S. Cl.
CPC .......... *H01M 4/364* (2013.01); *H01M 4/366* (2013.01); *H01M 4/483* (2013.01); *H01M 4/587* (2013.01); *H01M 4/624* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | |
|---|---|---|
| 2005/0214644 A1 | 9/2005 | Aramata et al. |
| 2014/0349180 A1 | 11/2014 | Kim et al. |
| 2016/0268591 A1 | 9/2016 | Choi et al. |
| 2016/0268600 A1* | 9/2016 | Jeong ................ H01M 4/0471 |
| 2017/0040602 A1 | 2/2017 | Ha et al. |
| 2017/0346079 A1* | 11/2017 | Friend ................ H01M 4/587 |
| 2019/0148718 A1 | 5/2019 | Hatazawa et al. |
| 2019/0252673 A1 | 8/2019 | Cha et al. |
| 2020/0194797 A1 | 6/2020 | Kim et al. |
| 2020/0350571 A1 | 11/2020 | Lee et al. |
| 2021/0083275 A1 | 3/2021 | Iwaya et al. |

FOREIGN PATENT DOCUMENTS

| | | |
|---|---|---|
| CN | 107223288 A | 9/2017 |
| GB | 2551369 A | 12/2017 |
| JP | 4623283 B2 | 2/2011 |
| JP | 2014-086231 A | 5/2014 |
| JP | 2017-054660 A | 3/2017 |
| JP | 2017-174527 A | 9/2017 |
| JP | 2017-538267 A | 12/2017 |
| KR | 10-2013-0116806 A | 10/2013 |
| KR | 10-1396521 B1 | 5/2014 |
| KR | 10-2014-0139294 A | 12/2014 |
| KR | 10-2016-0109946 A | 9/2016 |
| KR | 10-2017-0018208 A | 2/2017 |
| KR | 10-2017-0074030 A | 6/2017 |
| KR | 10-2017-0111746 A | 10/2017 |
| KR | 10-2018-0040334 A | 4/2018 |
| KR | 10-2019-0018680 A | 2/2019 |
| KR | 10-2019-0096649 A | 8/2019 |
| KR | 10-2019-0101474 A | 8/2019 |
| WO | 2019-168352 A1 | 6/2019 |

OTHER PUBLICATIONS

Extended European Search Report issued in corresponding European Patent Application No. 20889311.5 dated Dec. 23, 2022.
International Search Report (with partial English translation) and Written Opinion issued in corresponding International Patent Application No. PCT/KR2020/016074 dated Feb. 23, 2021.

* cited by examiner

*Primary Examiner* — Wyatt P McConnell
(74) *Attorney, Agent, or Firm* — Bryan Cave Leighton Paisner LLP

(57) ABSTRACT

The present invention relates to a negative electrode which includes a negative electrode current collector, and a negative electrode active material layer formed on the negative electrode current collector, wherein the negative electrode active material layer includes a silicon-based active material and a carbon-based active material, wherein a ratio of an average particle diameter ($D_{50}$) of the carbon-based active material to an average particle diameter ($D_{50}$) of the silicon-based active material is in a range of 2 to 8, and a porosity of the negative electrode is in a range of 48% to 62%.

13 Claims, No Drawings

NEGATIVE ELECTRODE AND SECONDARY BATTERY INCLUDING THE SAME

CROSS-REFERENCE TO RELATED APPLICATIONS

This application claims priority from Korean Patent Application No. 10-2019-0147927, filed on Nov. 18, 2019, the disclosure of which is incorporated by reference herein.

TECHNICAL FIELD

The present invention relates to a negative electrode and a secondary battery including the same.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In general, the lithium secondary battery includes a positive electrode, a negative electrode, a separator disposed between the positive electrode and the negative electrode, an electrolyte, and an organic solvent. Also, with respect to the positive electrode and the negative electrode, an active material layer including a positive electrode active material or a negative electrode active material may be formed on a current collector. A lithium-containing metal oxide, such as $LiCoO_2$ and $LiMn_2O_4$, is generally used as the positive electrode active material in the positive electrode, and, accordingly, a carbon-based active material or silicon-based negative electrode active material containing no lithium is used as the negative electrode active material in the negative electrode.

Particularly, the silicon-based negative electrode active material among the negative electrode active materials is attracting attention, because it has a capacity approximately 10 times higher than that of the carbon-based negative electrode active material, and is advantageous in that high energy density may be achieved even with a thin electrode due to its high capacity. However, the silicon-based negative electrode active material has not been widely used due to problems of volume expansion due to charge and discharge, the resulting cracks/damage of active material particles, and the resulting degradation of life characteristics.

Accordingly, there is a need to develop a secondary battery capable of improving the life characteristics while achieving the high capacity and energy density of the silicon-based negative electrode active material.

Korean Patent Application Laid-open Publication No. 10-2017-0074030 relates to a negative electrode active material for a lithium secondary battery, a method of preparing the same, and a lithium secondary battery including the same, and discloses the negative electrode active material including a porous silicon-carbon composite, but has limitations in solving the above-described problems.

PRIOR ART DOCUMENT

Patent Document

Korea Patent Application Laid-open Publication No. 10-2017-0074030

DISCLOSURE OF THE INVENTION

Technical Problem

An aspect of the present invention provides a mixed negative electrode of a silicon-based active material and a carbon-based active material which may prevent degradation of life characteristics due to volume expansion/contraction during charge and discharge of the silicon-based active material and may improve output performance and energy density.

Another aspect of the present invention provides a secondary battery including the above-described negative electrode.

Technical Solution

According to an aspect of the present invention, there is provided a negative electrode which includes: a negative electrode current collector; and a negative electrode active material layer formed on the negative electrode current collector, wherein the negative electrode active material layer includes a silicon-based active material and a carbon-based active material, wherein a ratio of an average particle diameter ($D_{50}$) of the carbon-based active material to an average particle diameter ($D_{50}$) of the silicon-based active material is in a range of 2 to 8, and a porosity of the negative electrode is in a range of 48% to 62%.

According to another aspect of the present invention, there is provided a secondary battery which includes: the above-described negative electrode; a positive electrode facing the negative electrode; a separator disposed between the negative electrode and the positive electrode; and an electrolyte.

Advantageous Effects

A negative electrode according to the present invention is characterized in that a ratio of average particle diameters of a silicon-based active material and a carbon-based active material and a porosity of the negative electrode are adjusted to a specific range. Since the negative electrode according to the present invention may adequately accommodate volume expansion/contraction due to charge and discharge of the silicon-based active material by having the porosity within the above range and may improve a degree of packing between particles by adjusting the particle diameter ratio of the large particle-diameter carbon-based active material to the small particle-diameter silicon-based active material, the negative electrode according to the present invention may further improve life characteristics by improving an electrical contact between the active materials and may achieve excellent output performance and energy density.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include", "comprise", or "have" when used in this specification, specify the presence of stated features, numbers, steps, elements, or combinations thereof, but do not preclude the presence or addition of one or more other features, numbers, steps, elements, or combinations thereof.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

<Negative Electrode>

The present invention relates to a negative electrode, and more particularly, to a negative electrode for a lithium secondary battery.

Specifically, the negative electrode according to the present invention includes a negative electrode current collector; and a negative electrode active material layer formed on the negative electrode current collector, wherein the negative electrode active material layer includes a silicon-based active material and a carbon-based active material, wherein a ratio of an average particle diameter ($D_{50}$) of the carbon-based active material to an average particle diameter ($D_{50}$) of the silicon-based active material is in a range of 2 to 8, and a porosity of the negative electrode is in a range of 48% to 62%.

In general, it is known that a silicon-based active material has a capacity approximately 10 times higher than that of a carbon-based active material, and, accordingly, in a case in which the silicon-based negative electrode active material is used in a negative electrode, it is expected that a thin film electrode having a high level of energy density may be achieved even with a small thickness. However, the silicon-based active material has a limitation in that degradation of lifetime caused by volume expansion/contraction occurs due to intercalation/deintercalation of lithium during charge and discharge. Particularly, during the charge and discharge of the silicon-based active material, damage to the active material occurs due to the rapid volume expansion/contraction of the active material, and there is a limitation in that the degradation of the lifetime is accelerated due to the damage of the active material.

In order to address these limitations, the negative electrode of the present invention may adequately accommodate a volume change during the rapid volume expansion/contraction of the silicon-based active material by adjusting the porosity to the above-described level, and, accordingly, life characteristics of the negative electrode may be significantly improved. Also, since the negative electrode of the present invention may improve packing between particles of the silicon-based active material and the carbon-based active material by adjusting the average particle diameter ratio of the carbon-based active material to the silicon-based active material to a specific range, a contact between the particles may be improved to improve the life characteristics of the negative electrode.

The negative electrode current collector is not particularly limited as long as it has high conductivity without causing adverse chemical changes in the battery. Specifically, copper, stainless steel, aluminum, nickel, titanium, fired carbon, copper or stainless steel that is surface-treated with one of carbon, nickel, titanium, silver, or the like, and an aluminum-cadmium alloy may be used as the negative electrode current collector.

The negative electrode current collector may typically have a thickness of 3 µm to 500 µm.

Microscopic irregularities may be formed on a surface of the negative electrode current collector to improve the adhesion of a negative electrode active material. For example, the negative electrode current collector may be used in various shapes such as that of a film, a sheet, a foil, a net, a porous body, a foam body, a non-woven fabric body, and the like.

The negative electrode active material layer is formed on the negative electrode current collector.

The negative electrode active material layer includes a silicon-based active material and a carbon-based active material.

The silicon-based active material may include silicon-based particles including a compound represented by Chemical formula 1 below.

$SiO_x$          [Chemical formula 1]

In Chemical formula 1, 0≤x<2.

In Chemical formula 1, since $SiO_2$ (when x=2 in Formula 1) does not react with lithium ions, it may not store lithium, and thus, x may be within the above range. Specifically, in terms of structural stability of the active material, x may satisfy 0.5≤x≤1.5.

The silicon-based active material may further include a metal distributed on a surface, inside, or the surface and the inside of the silicon-based particle.

The metal may be included in the silicon-based active material in terms of increasing efficiency of the active material by reducing a ratio of an irreversible phase (e.g., $SiO_2$) of the silicon-based active material by being distributed on the surface and/or the inside of the silicon-based active material.

The metal may include at least one selected from the group consisting of lithium (Li), magnesium (Mg), and aluminum (Al), may preferably include at least one selected from the group consisting of Li and Mg, and may more preferably be Mg in terms of the fact that the above-described effect of preventing the damage to the silicon-based oxide particle may be excellently achieved, and life characteristics of the negative electrode active material may be further improved due to low reactivity with moisture.

The metal may be included in an amount of 0.1 wt % to 25 wt %, for example, 3 wt % to 15 wt % in the silicon-based active material, and, when the amount of the metal is within the above range, it is preferable in terms of not reducing capacity while increasing the efficiency of the active material.

The silicon-based active material may further include a carbon coating layer formed on the silicon-based particle. The carbon coating layer may function as a protective layer for suppressing volume expansion of the silicon-based particle and preventing a side reaction with an electrolyte solution.

The carbon coating layer may be included in an amount of 0.1 wt % to 10 wt %, for example, 3 wt % to 7 wt % in the silicon-based active material, and, when the amount of the carbon coating layer is within the above range, it is preferable in terms of the fact that the carbon coating layer may prevent the side reaction with the electrolyte solution while controlling the volume expansion of the silicon-based particle to an excellent level.

The average particle diameter ($D_{50}$) of the silicon-based active material may be in a range of 0.1 μm to 20 μm, preferably 1 μm to 12 μm, and more preferably 4 μm to 8 μm in terms of ensuring structural stability of the active material during charge and discharge, preventing a problem in which a degree of volume expansion/contraction is increased as the particle diameter is excessively increased, and preventing a problem in which initial efficiency is reduced due to an excessively small particle diameter.

Since the carbon-based active material has a relatively lower degree of volume expansion due to charge and discharge than the silicon-based active material, the carbon-based active material may reduce an overall degree of volume expansion of the negative electrode.

The carbon-based active material may include at least one selected from the group consisting of artificial graphite, natural graphite, hard carbon, soft carbon, carbon black, acetylene black, Ketjen black, Super P, graphene, and fibrous carbon, and may preferably include at least one selected from the group consisting of artificial graphite and natural graphite.

The average particle diameter ($D_{50}$) of the carbon-based active material may be in a range of 5 μm to 35 μm, preferably 11 μm to 25 μm, and more preferably 12 μm to 18 μm in terms of ensuring the structural stability during charge and discharge and reducing the side reaction with the electrolyte solution.

A ratio of the average particle diameter ($D_{50}$) of the carbon-based active material to the average particle diameter ($D_{50}$) of the silicon-based active material is in a range of 2 to 8.

In the present specification, the expression "ratio of the average particle diameter ($D_{50}$) of the carbon-based active material to the average particle diameter ($D_{50}$) of the silicon-based active material" means a value obtained by dividing the average particle diameter ($D_{50}$) of the carbon-based active material by the average particle diameter ($D_{50}$) of the silicon-based active material.

According to the present invention, the negative electrode active material layer includes the small particle-diameter silicon-based active material and the large particle-diameter carbon-based active material, and, since the average particle diameter ratio may be adjusted to the above-described ratio, contact and packing between the particles of the silicon-based active material and the carbon-based active material may be improved. Accordingly, output characteristics and energy density of the active material may be improved, and, simultaneously, since an electrical contact between the active materials may be maintained despite the volume change of the silicon-based active material, the life characteristics may be improved.

In a case in which the ratio of the average particle diameter ($D_{50}$) of the carbon-based active material to the average particle diameter ($D_{50}$) of the silicon-based active material is less than 2, since the packing between the particles is not smooth, the energy density is decreased and the electrical contact is reduced, and thus, it is difficult to improve the life characteristics, and, in a case in which the ratio of the average particle diameter ($D_{50}$) of the carbon-based active material to the average particle diameter ($D_{50}$) of the silicon-based active material is greater than 8, since output performance is reduced to increase resistance, it is not desirable in terms of long-term cycle life characteristics.

The ratio of the average particle diameter ($D_{50}$) of the carbon-based active material to the average particle diameter ($D_{50}$) of the silicon-based active material may preferably be in a range of 2.2 to 5, and, in this case, the output performance and the energy density may be further improved while improving the electrical contact between the active materials.

The silicon-based active material and the carbon-based active material may be included in a weight ratio of 1:99 to 50:50, for example, 3:97 to 20:80 in the negative electrode active material layer in terms of further improving the above-described life performance and capacity characteristics of the active material.

The silicon-based active material and the carbon-based active material may be included in an amount of 80 wt % to 99 wt %, for example, 90 wt % to 98.5 wt % in the negative electrode active material layer.

The negative electrode active material layer may include a binder.

The binder may include at least one selected from the group consisting of a styrene butadiene rubber (SBR), an acrylonitrile butadiene rubber, an acrylic rubber, a butyl rubber, a fluoro rubber, carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), and polyacryl amide (PAM), in terms of further improving electrode adhesion and providing sufficient resistance to the volume expansion/contraction of the active material. Preferably, the binder may include a styrene-butadiene rubber in terms of having high strength, having excellent resistance to the volume expansion/contraction of the silicon-based negative electrode active material, and providing excellent flexibility to the binder to be able to prevent distortion or bending of the electrode.

The binder may be included in an amount of 0.5 wt % to 10 wt % in the negative electrode active material layer, and, when the amount of the binder is within the above range, it is desirable in terms of the fact that the volume expansion of the active material may be more effectively controlled.

The negative electrode active material layer may further include a conductive agent. The conductive agent may be used to improve conductivity of the negative electrode, and one having conductivity while not causing adverse chemical changes is preferable.

Specifically, the conductive agent may include at least one selected from the group consisting of a line-type conductive agent and a point-type conductive agent.

Preferably, the conductive agent may include a line-type conductive agent and a point-type conductive agent. The line-type conductive agent exists in the form of a line in the negative electrode to improve the electrical contact between the active materials, and, for example, may maintain a conductive network between the active materials even if a volume of the silicon-based active material is expanded by charge and discharge. Also, the line-type conductive agent may prevent a pore clogging phenomenon of the active material and aggregation between the conductive agents which may occur when only the point-type conductive agent is used. However, since the line-type conductive agent has a higher specific surface area than the point-type conductive agent, there is a risk of causing an electrolyte solution side reaction during high-temperature storage, and thus, it is preferable to use a mixture of the line-type conductive agent and the point-type conductive agent.

The point-type conductive agent may include at least one selected from the group consisting of conductive materials such as: graphite such as natural graphite or artificial graphite; carbon black such as acetylene black, Ketjen black, channel black, furnace black, lamp black, and thermal black; fluorocarbon; metal powder such as aluminum powder and nickel powder; conductive metal oxide such as titanium oxide; and polyphenylene derivatives, and may specifically include at least one selected from the group consisting of graphite, such as natural graphite or artificial graphite, and carbon black.

The line-type conductive agent may include at least one selected from the group consisting of conductive fibers such as carbon fibers, carbon nanofibers (CNF), and metal fibers; conductive tubes such as carbon nanotubes (CNT); and conductive whiskers such as zinc oxide whiskers and potassium titanate whiskers, may specifically include at least one selected from the group consisting of carbon nanofibers and carbon nanotubes, and may more specifically be carbon nanotubes in terms of the fact that they have excellent strength and may further improve the electrical contact of the active materials.

The conductive agent may include the line-type conductive agent and the point-type conductive agent in a weight ratio of 0.01:99.9 to 50:50, for example, 10:90 to 40:60, and, when the weight ratio is within the above range, an effect of improving the electrical contact by the line-type conductive agent and an effect of improving high-temperature storage performance by the point-type conductive agent may be more preferably achieved.

The conductive agent may be included in an amount of 0.5 wt % to 10 wt %, for example, 1 wt % to 5 wt % in the negative electrode active material layer.

A thickness of the negative electrode active material layer may be in a range of 30 μm to 150 μm, for example, 40 μm to 120 μm in terms of increasing an electrical contact with components of a negative electrode material.

A porosity of the negative electrode is in a range of 48% to 62%.

Since the negative electrode according to the present invention has a relatively high porosity, it may accommodate the volume expansion/contraction due to charge and discharge of the silicon-based active material and/or the carbon-based active material at a desirable level, and thus, the degradation of the life characteristics due to the volume expansion of the active material may be prevented to improve the life characteristics of the negative electrode. Also, there is a concern that the energy density and electrical contact of the negative electrode may decrease when the porosity of the negative electrode is within the above range, but, in the present invention, since the average particle diameter ratio of the carbon-based active material to the silicon-based active material is adjusted to the above-described range, the electrical contact of the active material is maintained while improving the energy density of the negative electrode, and thus, the life characteristics may be improved to a more desirable level.

If the porosity of the negative electrode is less than 48%, since it is difficult for pores in the negative electrode to smoothly accommodate the volume expansion of the silicon-based active material, there is a concern that the life characteristics may be significantly degraded. If the porosity of the negative electrode is greater than 62%, there is a concern that the life characteristics are degraded because the electrical contact between the active materials is decreased.

The porosity of the negative electrode may preferably be in a range of 52% to 58%, and, in this case, the volume change of the silicon-based active material may be smoothly accommodated, and the life characteristics may be improved to a desirable level by maintaining the electrical contact between the active materials.

In the present specification, the porosity of the negative electrode may be calculated by Equation 1 below.

$$\text{Porosity of the negative electrode (\%)} = \{1 - (\text{electrode density of the negative electrode}/\text{true density of the negative electrode})\} \times 100 \quad \text{[Equation 1]}$$

In Equation 1, the true density of the negative electrode is density of the negative electrode active material layer which is measured when the negative electrode is collected in a predetermined size and pressed with a press until a thickness of the negative electrode does not change, and the electrode density of the negative electrode is density of the negative electrode active material layer which is measured by collecting the negative electrode in a predetermined size.

The porosity of the negative electrode may be achieved by appropriately adjusting rolling conditions during the preparation of the negative electrode.

A negative electrode slurry is prepared by dispersing a negative electrode material, a binder, and a conductive agent in a solvent for forming a negative electrode slurry, and the negative electrode may be prepared by coating the negative electrode current collector with the negative electrode slurry, drying, and then rolling the coated negative electrode current collector.

The solvent for forming a negative electrode slurry may include at least one selected from the group consisting of distilled water, ethanol, methanol, and isopropyl alcohol, and may preferably include distilled water, in terms of facilitating the dispersion of the components.

<Secondary Battery>

The present invention provides a secondary battery including the above-described negative electrode, specifically a lithium secondary battery.

Specifically, the secondary battery according to the present invention includes the above-described negative electrode; a positive electrode facing the negative electrode; a separator disposed between the negative electrode and the positive electrode; and an electrolyte.

The positive electrode may include a positive electrode current collector; and a positive electrode active material layer formed on the positive electrode current collector.

The positive electrode current collector is not particularly limited as long as it has high conductivity without causing adverse chemical changes in the battery. Specifically, copper, stainless steel, aluminum, nickel, titanium, fired carbon, copper or stainless steel that is surface-treated with one of carbon, nickel, titanium, or silver, or an aluminum-cadmium alloy may be used as the positive electrode current collector.

The positive electrode current collector may typically have a thickness of 3 μm to 500 μm.

The positive electrode current collector may have a surface with fine roughness to improve adhesion to a positive electrode active material. For example, the positive electrode current collector may be used in various shapes such as a film, a sheet, a foil, a net, a porous body, a foam body, a non-woven fabric body, and the like.

The positive electrode active material layer may include a positive electrode active material.

Specifically, the positive electrode active material is a compound capable of reversibly intercalating and deintercalating lithium, wherein the positive electrode active material may include a lithium transition metal composite oxide including lithium and at least one transition metal selected from a group consisting of nickel, cobalt, manganese, and aluminum, for example, a lithium transition metal composite oxide including lithium and transition metal containing nickel, cobalt, and manganese.

More specifically, the lithium transition metal composite oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}CoY_1O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{g2}Mn_{r3}Ms_2)O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p3<1$, $0<q2<1$, $0<r3<1$, $0<S2<1$, and $p2+q2+r3+S2=1$), and any one thereof or a mixture of two or more thereof may be included. Among these materials, in terms of the improvement of capacity characteristics and stability of the battery, the lithium transition metal composite oxide may include $LiCoO_2$, $LiMnO_2$, $LiNiO_2$, lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.5}Mn_{0.1}Co_{0.1})O_2$), or lithium nickel cobalt aluminum oxide (e.g., $LiNi_{0.5}Co_{0.15}Al_{0.05}O_2$, etc.), and, in consideration of a significant improvement due to the control of type and content ratio of elements constituting the lithium transition metal composite oxide, the lithium transition metal composite oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.5}Mn_{0.1}Co_{0.1})O_2$, and any one thereof or a mixture of two or more thereof may be used.

The positive electrode active material may be included in an amount of 80 wt % to 99 wt %, for example, 92 wt % to 98.5 wt % in the positive electrode active material layer in consideration of exhibition of sufficient capacity of the positive electrode active material.

The positive electrode active material layer may further include a binder and/or a conductive agent as well as the above-described positive electrode active material.

The binder is a component that assists in the binding between the active material and the conductive agent and in the binding with the current collector, wherein, specifically, the binder may include at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, and a fluoro rubber, and may preferably include polyvinylidene fluoride.

The binder may be included in an amount of 1 wt % to 20 wt %, for example, 1.2 wt % to 10 wt % in the positive electrode active material layer in terms of sufficiently securing the binding between the components such as the positive electrode active material.

The conductive agent may be used to assist and improve conductivity in the secondary battery, and is not particularly limited as long as it has conductivity without causing adverse chemical changes. Specifically, the conductive agent may include at least one selected from the group consisting of graphite such as natural graphite and artificial graphite; carbon black such as acetylene black, Ketjen black, channel black, furnace black, lamp black, and thermal black; conductive fibers such as carbon fibers or metal fibers; conductive tubers such as carbon nanotubes; fluorocarbon; metal powders such as aluminum powder and nickel powder; conductive whiskers such as zinc oxide whiskers and potassium titanate whiskers; conductive metal oxide such as titanium oxide; and polyphenylene derivatives, and may preferably include carbon black in terms of improving the conductivity.

The conductive agent may be included in an amount of 1 wt % to 20 wt %, for example, 1.2 wt % to 10 wt % in the positive electrode active material layer in terms of sufficiently securing electrical conductivity.

A thickness of the positive electrode active material layer may be in a range of 30 μm to 400 μm, for example, 50 μm to 110 μm.

The positive electrode may be prepared by coating a positive electrode slurry containing the positive electrode active material as well as selectively the binder, the conductive agent, and a solvent for forming a positive electrode slurry onto the positive electrode current collector, then drying and rolling the coated positive electrode current collector.

The solvent for forming a positive electrode slurry may include an organic solvent, such as N-methyl-2-pyrrolidone (NMP), and may be used in an amount such that desirable viscosity is obtained when the positive electrode active material as well as selectively the binder and the conductive agent are included. For example, the solvent for forming a positive electrode slurry may be included in the positive electrode slurry in an amount such that a concentration of a solid content including the positive electrode active material as well as selectively the binder and the conductive agent is in a range of 50 wt % to 95 wt %, for example, 70 wt % to 90 wt %.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

The secondary battery may be prepared by injecting an electrolyte solution after disposing the separator between the above-described negative electrode and positive electrode, according to a conventional method of preparing a secondary battery.

The secondary battery according to the present invention is suitable for portable devices, such as mobile phones, notebook computers, and digital cameras, and electric cars such as hybrid electric vehicles (HEVs), and, particularly, may be preferably used as a component battery of a medium and large sized battery module. Thus, the present invention also provides a medium and large sized battery module including the above-described secondary battery as a unit cell.

The medium and large sized battery module may be preferably used as a power source requiring high power and large capacity, for example, an electric vehicle, a hybrid electric vehicle, or a power storage device.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Example 1: Preparation of Negative Electrode

<Preparation of Silicon-Based Active Material>

SiO particles were prepared as silicon-based particles. The SiO particles were mixed with magnesium (Mg) as a metal-containing material, and the mixture was heat-treated at 1,200° C. for 3 hours to prepare SiO particles having Mg distributed on surfaces and/or inside thereof.

A silicon-based active material (average particle diameter ($D_{50}$): 6 μm) was prepared by forming a carbon coating layer on the SiO particles having Mg distributed on the surfaces and/or the inside thereof by chemical vapor deposition (CVD) of methane, as a hydrocarbon gas, at 950° C.

In the silicon-based active material, a weight ratio of the silicon-based particles:the metal (Mg):the carbon coating layer was 85:10:5.

<Preparation of Negative Electrode>

A mixture, in which the above-prepared silicon-based active material and natural graphite (average particle diameter ($D_{50}$): 16 μm), as a carbon-based active material, were mixed in a weight ratio of 10:90, was used as a negative electrode active material.

The negative electrode active material, a styrene-butadiene rubber (SBR) as a binder, carbon black as a point-type conductive agent, carbon nanotubes (CNT) as a line-type conductive agent, and carboxymethyl cellulose (CMC), as a thickener, were mixed in a weight ratio of 95.5:2:1:0.5:1, and the mixture was added to distilled water, as a solvent for forming a negative electrode slurry, to prepare a negative electrode slurry.

The negative electrode slurry was coated on one surface of a copper current collector (thickness: 15 μm), as a negative electrode current collector, with a loading of 3.6 mAh/cm², and the coated negative electrode current collector was roll-pressed and dried in a vacuum oven at 130° C. for 10 hours to form a negative electrode active material layer (thickness: 93 μm), which was used as a negative electrode according to Example 1 (thickness of the negative electrode: 108 μm).

The roll pressing was performed by forming the negative electrode active material layer on the negative electrode current collector, then placing it between two rolls of a press, and applying a nip pressure, and a gap between the two rolls was set to 108 μm.

In Example 1, a ratio of the average particle diameter ($D_{50}$) of the carbon-based active material to the average particle diameter ($D_{50}$) of the silicon-based active material was about 2.6, and a porosity of the prepared negative electrode was 54%.

Example 2: Preparation of Negative Electrode

A negative electrode of Example 2 was prepared in the same manner as in Example 1 except that roll pressing was performed by setting the gap between the two rolls to 101 μm.

In Example 2, a ratio of the average particle diameter ($D_{50}$) of the carbon-based active material to the average particle diameter ($D_{50}$) of the silicon-based active material was about 2.6, and a porosity of the prepared negative electrode was 50%.

Example 3: Preparation of Negative Electrode

A negative electrode of Example 3 was prepared in the same manner as in Example 1 except that roll pressing was performed by setting the gap between the two rolls to 122 μm.

In Example 3, a ratio of the average particle diameter ($D_{50}$) of the carbon-based active material to the average particle diameter ($D_{50}$) of the silicon-based active material was about 2.6, and a porosity of the prepared negative electrode was 60%.

Example 4: Preparation of Negative Electrode

A negative electrode of Example 4 was prepared in the same manner as in Example 1 except that SiO particles (average particle diameter ($D_{50}$): 6 μm) were used as a silicon-based active material.

In Example 4, a ratio of the average particle diameter ($D_{50}$) of the carbon-based active material to the average particle diameter ($D_{50}$) of the silicon-based active material was about 2.6, and a porosity of the prepared negative electrode was 55%.

Comparative Example 1: Preparation of Negative Electrode

A negative electrode of Comparative Example 1 was prepared in the same manner as in Example 1 except that roll pressing was performed by setting the gap between the two rolls to 93 μm.

In Comparative Example 1, a ratio of the average particle diameter ($D_{50}$) of the carbon-based active material to the average particle diameter ($D_{50}$) of the silicon-based active material was about 2.6, and a porosity of the prepared negative electrode was 45%.

Comparative Example 2: Preparation of Negative Electrode

A negative electrode of Comparative Example 2 was prepared in the same manner as in Example 1 except that roll pressing was performed by setting the gap between the two rolls to 137 μm.

In Comparative Example 2, a ratio of the average particle diameter ($D_{50}$) of the carbon-based active material to the average particle diameter ($D_{50}$) of the silicon-based active material was about 2.6, and a porosity of the prepared negative electrode was 65%.

Comparative Example 3: Preparation of Negative Electrode

<Preparation of Silicon-Based Active Material>

SiO particles were prepared as silicon-based particles. The SiO particles were mixed with Mg as a metal-containing material, and the mixture was heat-treated at 1,200° C. for 3 hours to prepare SiO particles having Mg distributed on surfaces and/or inside thereof.

A silicon-based active material (average particle diameter ($D_{50}$): 10 μm) was prepared by forming a carbon coating layer on the SiO particles having Mg distributed on the surfaces and/or the inside thereof by chemical vapor deposition (CVD) of methane, as a hydrocarbon gas, at 950° C.

In the silicon-based active material, a weight ratio of the silicon-based particles:the metal (Mg):the carbon coating layer was 85:10:5.

<Preparation of Negative Electrode>

A negative electrode was prepared in the same manner as in Example 1 except that the above-prepared silicon-based active material was used.

Comparative Example 4: Preparation of Negative Electrode

<Preparation of Silicon-Based Active Material>

SiO particles were prepared as silicon-based particles. The SiO particles were mixed with Mg as a metal-containing material, and the mixture was heat-treated at 1,200° C. for 3 hours to prepare SiO particles having Mg distributed on surfaces and/or inside thereof.

A silicon-based active material (average particle diameter ($D_{50}$): 2 μm) was prepared by forming a carbon coating layer on the SiO particles having Mg distributed on the surfaces and/or the inside thereof by chemical vapor deposition (CVD) of methane, as a hydrocarbon gas, at 950° C.

In the silicon-based active material, a weight ratio of the silicon-based particles:the metal (Mg):the carbon coating layer was 85:10:5.

<Preparation of Negative Electrode>

A negative electrode was prepared in the same manner as in Example 1 except that the above-prepared silicon-based active material and natural graphite (average particle diameter ($D_{50}$):20 μm), as a carbon-based active material, were used.

TABLE 1

| | Silicon-based active material Average particle diameter ($D_{50}$) (μm) | Carbon-based active material (natural graphite) Average particle diameter ($D_{50}$) (μm) | Ratio of the average particle diameter ($D_{50}$) of the carbon-based active material to the average particle diameter ($D_{50}$) of the silicon-based active material | Porosity of the negative electrode (%) |
|---|---|---|---|---|
| Example 1 | 6 | 16 | about 2.6 | 54 |
| Example 2 | 6 | 16 | about 2.6 | 50 |
| Example 3 | 6 | 16 | about 2.6 | 60 |

TABLE 1-continued

| | Silicon-based active material Average particle diameter ($D_{50}$) (μm) | Carbon-based active material (natural graphite) Average particle diameter ($D_{50}$) (μm) | Ratio of the average particle diameter ($D_{50}$) of the carbon-based active material to the average particle diameter ($D_{50}$) of the silicon-based active material | Porosity of the negative electrode (%) |
|---|---|---|---|---|
| Example 4 | 6 | 16 | about 2.6 | 55 |
| Comparative Example 1 | 6 | 16 | about 2.6 | 45 |
| Comparative Example 2 | 6 | 16 | about 2.6 | 65 |
| Comparative Example 3 | 10 | 16 | about 1.6 | 55 |
| Comparative Example 4 | 2 | 20 | about 8.3 | 55 |

Experimental Examples

<Preparation of Secondary Battery>

$LiMn_2O_4$ as a positive electrode active material, Denka black as a conductive agent, and polyvinylidene fluoride (PVdF), as a binder, were added to N-methyl pyrrolidone (NMP) at a weight ratio of 96.5:2.0:1.5 to prepare a positive electrode slurry. An aluminum current collector was coated with the positive electrode slurry, roll-pressed, and dried to prepare a positive electrode.

A polyethylene porous separator was disposed between the positive electrode and each of the negative electrodes prepared in Examples 1 to 4 and Comparative Examples 1 to 4, and an electrolyte solution was injected to prepare a pouch type secondary battery.

The electrolyte solution used was prepared by dissolving 1.5 wt % vinylene carbonate (VC) in a solution, in which ethyl methyl carbonate (EMC) and ethylene carbonate (EC) were mixed in a volume ratio of 7:3, and dissolving $LiPF_6$ to a concentration of 1 M.

Experimental Example 1: Life Characteristics Evaluation

<Capacity Retention Evaluation>

Cycle capacity retentions were evaluated for the secondary batteries prepared in Examples 1 to 4 and Comparative Examples 1 to 4 using an electrochemical charger/discharger.

With respect to the cycle capacity retention, charging and discharging were performed at 0.1 C in a first cycle and a second cycle, and charging and discharging were performed at 0.5 C from a third cycle (charge condition: CC (constant current)/CV (constant voltage), 5 mV/0.005 C cut-off, discharge condition: CC, 1.5 V cut off).

The capacity retention was calculated as follows.

Capacity retention (%)={(discharge capacity in an $N^{th}$ cycle)/(discharge capacity in the first cycle)}×100

(where N is an integer of 1 or more.)

$100^{th}$ cycle capacity retentions (%) are presented in Table 2 below.

TABLE 2

| | $100^{th}$ cycle capacity retention (%) |
|---|---|
| Example 1 | 98 |
| Example 2 | 96 |
| Example 3 | 97 |
| Example 4 | 93 |
| Comparative Example 1 | 71 |
| Comparative Example 2 | 78 |
| Comparative Example 3 | 79 |
| Comparative Example 4 | 81 |

Referring to Table 2, it may be understood that the negative electrodes of Examples 1 to 4, in which the average particle diameter ratio of the carbon-based active material to the silicon-based active material and the porosity of the negative electrode satisfy the ranges of the present invention, had a better life performance than the comparative examples.

Experimental Example 2: Output Performance Evaluation 1) resistance evaluation and 2) rapid charging performance evaluation were performed on the secondary batteries prepared in Examples 1 to 4 and Comparative Examples 1 to 4.

Specifically, with respect to 1) resistance evaluation, a voltage change was measured by discharging each secondary battery at 3 C for 30 seconds at a state of charge (SOC) of the negative electrode of 50%, a resistance value was calculated using the voltage change, and relative values of resistances of the examples and the comparative examples when Example 1 was set as 100% are presented in Table 3. Also, with respect to 2) rapid charging performance evaluation, each secondary battery was charged at 3 C to measure an SOC at a time when lithium was precipitated, and the results thereof are presented in Table 3.

TABLE 3

| | Resistance evaluation (%) | 3 C Li-Plating SOC (%) |
|---|---|---|
| Example 1 | 100 | 32 |
| Example 2 | 106 | 30 |

TABLE 3-continued

| | Resistance evaluation (%) | 3 C Li-Plating SOC (%) |
|---|---|---|
| Example 3 | 97 | 34 |
| Example 4 | 99 | 31 |
| Comparative Example 1 | 107 | 27 |
| Comparative Example 2 | 88 | 34 |
| Comparative Example 3 | 87 | 30 |
| Comparative Example 4 | 86 | 29 |

Referring to Table 3, it may be understood that the negative electrodes of Examples 1 to 4, in which the average particle diameter ratio of the carbon-based active material to the silicon-based active material and the porosity of the negative electrode satisfy the ranges of the present invention, exhibited a relatively high level of output performance. Thus, it may be confirmed that the negative electrodes according to the present invention may simultaneously improve the life characteristics and the output performance to a desirable level.

With respect to Comparative Example 1, since resistance increases and the time of the precipitation of lithium during the high-current charge at 3 C was fast, it may be confirmed that rapid charging performance was significantly reduced.

With respect to Comparative Example 2, output performance seemed to be slightly better than that of Example 1, but life characteristics were significantly degraded as described above, and thus, overall battery characteristics were not good.

With respect to Comparative Example 3 and Comparative Example 4, since rapid charging performances were degraded when compared to Example 1 and life characteristics were significantly degraded as described above, overall battery characteristics were not good.

The invention claimed is:

1. A negative electrode comprising:
a negative electrode current collector; and
a negative electrode active material layer on the negative electrode current collector,
wherein the negative electrode active material layer comprises a silicon-based active material and a carbon-based active material,
wherein a ratio of an average particle diameter ($D_{50}$) of the carbon-based active material to an average particle diameter ($D_{50}$) of the silicon-based active material is in a range of 2 to 8,
a porosity of the negative electrode is in a range of 48% to 62%,
wherein the porosity of the negative electrode is calculated by an Equation 1 below:

porosity of the negative electrode (%)={1−(electrode density of the negative electrode/true density of the negative electrode)}×100      [Equation 1]

wherein the true density of the negative electrode is density of the negative electrode active material layer which is measured when the negative electrode is collected in a predetermined size and pressed with a press until a thickness of the negative electrode does not change, and the electrode density of the negative electrode is density of the negative electrode active material layer which is measured by collecting the negative electrode in a predetermined size.

2. The negative electrode of claim 1, wherein the porosity of the negative electrode is in a range of 52% to 58%.

3. The negative electrode of claim 1, wherein the ratio of the average particle diameter ($D_{50}$) of the carbon-based active material to the average particle diameter ($D_{50}$) of the silicon-based active material is in a range of 2.2 to 5.0.

4. The negative electrode of claim 1, wherein a weight ratio of the silicon-based active material to the carbon-based active material is 1:99 to 50:50.

5. The negative electrode of claim 1, wherein the average particle diameter ($D_{50}$) of the carbon-based active material is in a range of 5 μm to 35 μm.

6. The negative electrode of claim 1, wherein the average particle diameter ($D_{50}$) of the silicon-based active material is in a range of 0.1 μm to 20 μm.

7. The negative electrode of claim 1, wherein the silicon-based active material comprises silicon-based particles including a compound represented by Chemical formula 1:

$SiO_x(0 \le x < 2)$.      Chemical formula 1

8. The negative electrode of claim 7, wherein the silicon-based active material further comprises a metal distributed on a surface, inside, or the surface and the inside of the silicon-based particle, and
the metal comprises at least one selected from the group consisting of lithium (Li), magnesium (Mg), and aluminum (Al).

9. The negative electrode of claim 8, wherein the metal is included in an amount of 0.1 wt % to 25 wt % in the silicon-based active material.

10. The negative electrode of claim 1, wherein the carbon-based active material comprises at least one selected from the group consisting of artificial graphite, natural graphite, hard carbon, soft carbon, carbon black, acetylene black, Ketjen black, Super P, graphene, and fibrous carbon.

11. The negative electrode of claim 1, wherein the negative electrode active material layer further comprises a conductive agent, and
the conductive agent comprises at least one selected from the group consisting of a line-type conductive agent and a point-type conductive agent,
wherein the point-type conductive agent includes at least one selected from the group consisting of graphite; carbon black; fluorocarbon; metal powder; conductive metal oxide; and polyphenylene derivatives, and
the line-type conductive agent includes at least one selected from the group consisting of conductive fibers; conductive tubes; and conductive whiskers.

12. The negative electrode of claim 11, wherein a weight ratio of the line-type conductive agent to the point-type conductive agent is 0.01:99.9 to 50:50.

13. A secondary battery comprising:
the negative electrode of claim 1;
a positive electrode facing the negative electrode;
a separator disposed between the negative electrode and the positive electrode; and
an electrolyte.

* * * * *